US012326986B2

(12) United States Patent
Costello et al.

(10) Patent No.: US 12,326,986 B2
(45) Date of Patent: Jun. 10, 2025

(54) INPUT DEVICE FOR USERS WITH LIMITED MOBILITY

(71) Applicant: Logitech Europe S.A., Lausanne (CH)

(72) Inventors: Donnacha Costello, Dublin (IE); Nicolas Jinkinson, St-Sulpice (CH); Christophe Dayer, Geneva (CH); Nicolas Chauvin, Chexbres (CH); Riccardo Chianella, Lausanne (CH); Eoin McNally, Dublin (IE); Bayden Filleul, County Wicklow (IE); Jenni Toriseva, Vantaa (FI); Greg Dizac, Lausanne (CH); Michael Richards, Lausanne (CH)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 18/159,403

(22) Filed: Jan. 25, 2023

(65) Prior Publication Data
US 2024/0248549 A1   Jul. 25, 2024

(51) Int. Cl.
*G06F 3/0354* (2013.01)
*G06F 3/0362* (2013.01)

(52) U.S. Cl.
CPC ...... *G06F 3/03543* (2013.01); *G06F 3/03549* (2013.01); *G06F 3/0362* (2013.01)

(58) Field of Classification Search
CPC . G06F 3/03543; G06F 3/03549; G06F 3/0362
See application file for complete search history.

(56) References Cited

U.S. PATENT DOCUMENTS

| 2003/0025673 | A1* | 2/2003 | Ledbetter | G06F 3/03543 345/163 |
| 2006/0001657 | A1* | 1/2006 | Monney | G06F 3/03543 345/184 |
| 2006/0274044 | A1* | 12/2006 | Gikandi | G06F 3/03543 345/163 |
| 2007/0139376 | A1* | 6/2007 | Giles | G06F 3/03543 345/163 |
| 2011/0221677 | A1* | 9/2011 | Cavacuiti | G06F 3/03549 345/167 |

* cited by examiner

*Primary Examiner* — Hang Lin
(74) *Attorney, Agent, or Firm* — Kilpatrick Townsend & Stockton LLP

(57) ABSTRACT

A computer mouse includes a housing, one or more processors disposed in the housing, and a trackball and a scroll bar configured on a top side of the housing and controlled by the one or more processors. The scroll bar has a width that is at least twice a diameter of the scroll bar. The housing has a triangular shape defined by three corners and three sides, each of the three sides coupled to a corresponding two of the three corners. A center of the trackball is configured at a location between a center point of the top side of the housing and a first corner of the three corners. The scroll bar can be configured between the center point of the top side of the housing and a first side of the three sides, the first side being opposite the first corner of the three corners.

9 Claims, 10 Drawing Sheets

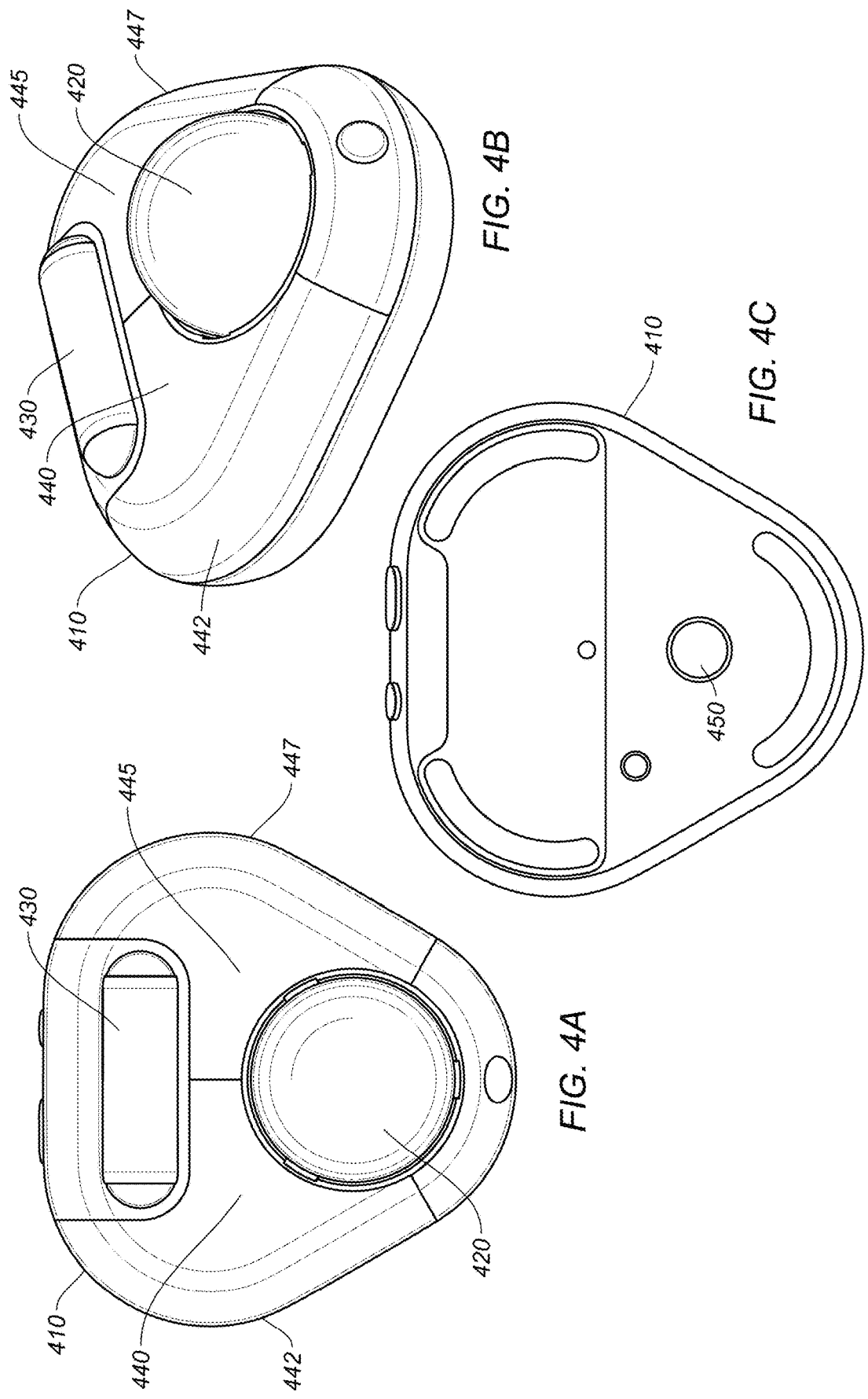

INPUT DEVICE FOR USERS WITH LIMITED MOBILITY

BACKGROUND

The computer mouse has been long established as a quintessential tool for facilitating efficient interfacing between human and modern personal computing devices. Computer mice have undergone substantial improvements over the last several decades. Some computer mice are designed for high performance gaming with high communication rates, high accuracy and precision with movement sensing (e.g., optical sensor(s)) and input detection (e.g., buttons, scroll wheels), and light weight. Some computer mice are design for productivity and may include multiple programmable buttons that can be accessible by a thumb or multiple fingers, switching between multiple host computing devices, and other useful features.

In most cases, computer mice are designed to be universal and to accommodate a large variety of hand sizes and use cases (e.g., gaming, productivity), which can promote more sales and wider adoption by computer users. However, universal designs often poorly accommodate users with physical limitations or impairments. Some physical limitations may make articulating certain common inputs, like button presses, scrolling, movement, etc., in an accurate and efficient manner quite difficult, inefficient, or even impractical for some users. Despite the many advancements in computer mice over the years, better designs are needed to accommodate users with physical limitations.

BRIEF SUMMARY

In certain embodiments, a computer mouse comprises a housing having a top side and a bottom side, one or more processors disposed in the housing, a trackball configured on the top side of the housing and controlled by the one or more processors, and a scroll bar disposed in the top side of the housing and controlled by the one or more processors. A width of the scroll bar can be at least twice a diameter of the scroll bar, and the bottom side of the housing can be configured to be placed on a surface while the computer mouse is being operated. In some aspects, the housing has a triangular shape defined by three corners and three sides, each of the three sides coupled to a corresponding two of the three corners. A center of the trackball may be configured on the top side of the housing at a location between a center point of the top side of the housing and a first corner of the three corners. The scroll bar can be configured on the top side of the housing at a location between the center point of the top side of the housing and a first side of the three sides, the first side being opposite the first corner of the three corners. In some embodiments, the scroll bar can be oriented parallel or perpendicular to the first corner. In some aspects, a diameter of the trackball may be between 30-60 mm inclusive. The computer mouse can further include a first button configured on the top side of the housing, and a second button configured on the top side of the housing. The first button and second button may be controlled by the one or more processors, and the first button and second button may form at least a portion of the top side of the housing. In some aspects, the first button curves from the top side of the housing to a first side of the housing, wherein the first button is operable to be activated by a downward pressing force imparted on the top side of the housing and on a lateral pressing force imparted on the first side of the housing, wherein the second button curves from the top side of the housing to a second side of the housing, and wherein the second button is operable to be activated by a downward pressing force imparted on the top side of the housing and on a lateral pressing force imparted on the second side of the housing. The bottom side of the housing may include a mounting fixture that is operable to secure the computer mouse to an underlying surface. The width of the scroll bar is typically within +/-20% of the diameter of the trackball.

In some embodiments, a computer mouse comprises a housing having a triangular shape defined by three corners and three sides, each of the three sides coupled to a corresponding two of the three corners, a top side, and a bottom side; one or more processors disposed in the housing; and a trackball configured on the top side of the housing and controlled by the one or more processors. The computer mouse can further comprise a scroll bar disposed in the top side of the housing and controlled by the one or more processors, wherein a width of the scroll bar is at least twice a diameter of the scroll bar, and wherein the bottom side of the housing is configured to be placed on a surface while the computer mouse is being operated. The width of the scroll bar can be within +/-20% of the diameter of the trackball. In some aspects, a center of the trackball is configured on the top side of the housing at a location between a center point of the top side of the housing and a first corner of the three corners. In some embodiments, a first button configured on the top side of the housing and a second button configured on the top side of the housing, wherein the first button and second button are controlled by the one or more processors, and wherein the first button and second button form at least a portion of the top side of the housing. In some cases, the first button curves from the top side of the housing to a first side of the housing, wherein the first button is operable to be activated by a downward pressing force imparted on the top side of the housing and on a lateral pressing force imparted on the first side of the housing, wherein the second button curves from the top side of the housing to a second side of the housing, and wherein the second button is operable to be activated by a downward pressing force imparted on the top side of the housing and on a lateral pressing force imparted on the second side of the housing. In some embodiments, the bottom side of the housing includes a mounting fixture that is operable to secure the computer mouse to an underlying surface.

In further embodiments, a computer mouse comprises a housing having a triangular shape defined by three corners and three sides, each of the three sides coupled to a corresponding two of the three corners, a top side, and a bottom side; one or more processors disposed in the housing; a scroll bar disposed in the top side of the housing and controlled by the one or more processors, wherein a width of the scroll bar is at least twice a diameter of the scroll bar, and wherein the bottom side of the housing is configured to be placed on a surface while the computer mouse is being operated. In some implementations, the scroll bar is configured on the top side of the housing at a location between a center point of the top side of the housing and a first side of the three sides, the first side being opposite a first corner of the three corners, and wherein the scroll bar is oriented parallel to the first corner.

In certain embodiments, a computer mouse comprises a housing having a top side, a bottom side, wherein the top side is pill-shaped, one or more processors disposed in the housing, a trackball configured on the top side of the housing and controlled by the one or more processors, and a scroll bar disposed in the top side of the housing and controlled by the one or more processors, wherein a width of the scroll bar is at least twice a diameter of the scroll bar, and wherein the bottom side of the housing is configured to be placed on a surface while the computer mouse is being operated.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

BRIEF DESCRIPTION OF THE DRAWINGS

The features of the various embodiments described above, as well as other features and advantages of certain embodiments of the present invention will be more apparent from the following detailed description taken in conjunction with the accompanying drawings, in which:

FIGS. 4A-4C show different views of a novel computer peripheral device, according to certain embodiments;

Throughout the drawings, it should be noted that like reference numbers are typically used to depict the same or similar elements, features, and structures.

DETAILED DESCRIPTION

Figure 1:
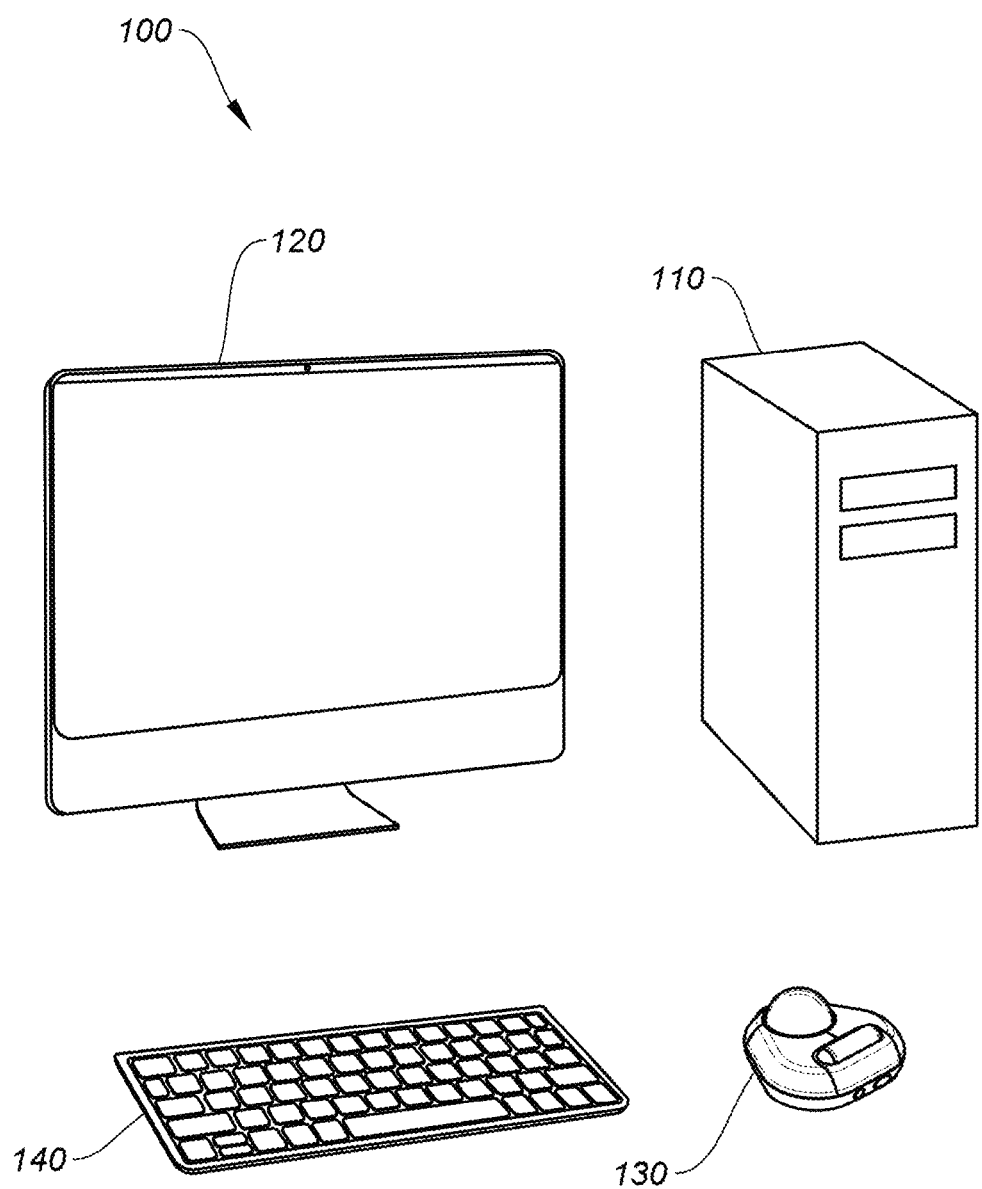
FIG. 1 shows a simplified example of a computer system that can include any of a variety of host computing devices and computer peripheral devices, including computer peripheral devices that can be configured to perform aspects of the various inventive concepts described herein.

Aspects of the present disclosure relate generally to electronic devices, and more particularly to computer peripheral devices, according to certain embodiments.

In the following description, various examples of a computer peripheral device (e.g., a computer mouse) are described. For purposes of explanation, specific configurations and details are set forth to provide a thorough understanding of the embodiments. However, it will be apparent to one skilled in the art that certain embodiments may be practiced or implemented without every detail disclosed. Furthermore, well-known features may be omitted or simplified to prevent any obfuscation of the novel features described herein.

The following high-level summary is intended to provide a basic understanding of some of the novel innovations depicted in the figures and presented in the corresponding descriptions provided below. Aspects of the invention relate to a computer peripheral device, which can be described as a computer mouse, that can accommodate users with physical limitations and impaired fine motor control of their hands substantially better than conventional computer peripheral devices. Even contemporary designs configured for users with physical disabilities are often large, cumbersome, stylized in a manner that is similar children's computer peripheral devices, and lack a refined, professional industrial design and high-performance operational characteristics. Some embodiments utilize a more compact industrial design and a unique combination of features including a track ball and scroll bar, among other input elements. The compact design allows users with some physical disabilities to brace and/or anchor portions of their hand (e.g., fingers) on a work surface while their palm or other hand features rest on and operate the trackball and/or scroll bar and move between them. On the other hand, the larger contemporary designs typically have a large housing to support the oversized input elements (e.g., 100 mm trackball) that have conventionally been considered to better accommodate users with physical disabilities, but often makes manipulating those devices more difficult and unwieldy, and bracing a hand against the work surface while still accessing input elements is typically not possible.

In some embodiments, the housing may be triangle shaped, which can present many advantages. The housing can be oriented in multiple ways (see, e.g., FIGS. 5A-7B), the trackball can be configured in a corner of the triangle so that the trackball can be accessed from different sides depending on the user's preference without the small surrounding bezel (housing) getting in the way (see, e.g., FIG. 5). The scroll bar may be large and oriented for easy access and control, and to facilitate easy transitions from the smaller trackball (e.g., 30 mm-60 mm diameter) to the large scroll bar and vice versa. The scroll bar is typically configured on a side opposite of the corner that the trackball is configured (see, e.g., FIG. 4A), which is large enough to accommodate the scroll bar's large size, and there is enough clearance between the scroll bar and trackball that users can manipulate one without inadvertently manipulating the other. Typically, the scroll bar has a width that is approximately the diameter of the trackball (e.g., typically within 20%). Some embodiments can include large and easily accessible left and right buttons configured on the housing (see, e.g., FIG. 4A). The left and right buttons may be pressed from the top, like most designs, and also pressed from the side (e.g., laterally pressed from a user's hand braced on the work surface adjacent to the computer mouse) to instantiate a button press. The left and right buttons can be programmed, enabled/disabled to help avoid inadvertent triggering, and can work in conjunction with other standalone buttons, as further described below with respect to FIGS. 8A-8B. In alternative embodiments, the housing may have a pill or "racetrack" shape, as shown in FIGS. 8C-8D, which has similar advantages regarding the trackball, scroll-bar, and buttons. In general, the compact nature of the small housing (e.g., triangular, pill-shaped), the sizing and placement of the trackball and scroll bar relative to each other, and the accessibility of the left/right mouse buttons provide a professional looking, high-performance, high-quality computer peripheral device that does not require fine motor skills to effectively utilize it in a productive manner, making it an excellent computer interface solution for users with or without physical limitations and handicaps.

FIG. 1 shows a simplified example of a computer system 100 that can include any of a variety of host computing devices and computer peripheral devices, including computer peripheral devices (e.g., a computer mouse) that can be configured to perform aspects of the various inventive concepts described herein. Computer system 100 can include computer 110, monitor 120, computer mouse 130, and keyboard 140. In some embodiments, input device 130 can be a computer mouse, a remote-control device, a game controller (e.g., game pad, joystick, flight stick, etc.) or elements thereof (e.g., hat switch), or other suitable device that can be used to convert analog inputs into digital signals for computer processing. In some cases, keyboard 140 can be a "qwerty" style keyboard, or any suitable input device (e.g., internet-of-things device, AR/VR controller, or the like). For computer system 100, input devices 130, 140 can be configured to control various aspects of computer 110 and monitor 120, as would be appreciated by one of ordinary skill in the art with the benefit of this disclosure. The monitor 120, computer mouse 130, and keyboard 140 may be referred to as "computer peripheral devices." Computer peripheral devices 120-140 can be communicatively coupled to host computing device 110.

Computer 110 can be any suitable computing device including, but not limited to, a desktop computer, a laptop computer, a tablet or "phablet" computer, a smart phone, a PDA, a wearable device (e.g., smart watches, smart glasses), virtual reality/augmented reality (AR/VR) system, or the like. A host computing device may also be referred to herein as a "host computer," "host device," "computing device," "computer," or the like, and may include a machine-readable medium (not shown) configured to store computer code, such as driver software, firmware, and the like, where the computer code may be executable by one or more processors of the host computing device(s) (see, e.g., processor 210 of FIG. 2) to control aspects of the host computing device, for instance, via the one or more computer peripheral devices.

Figure 2:
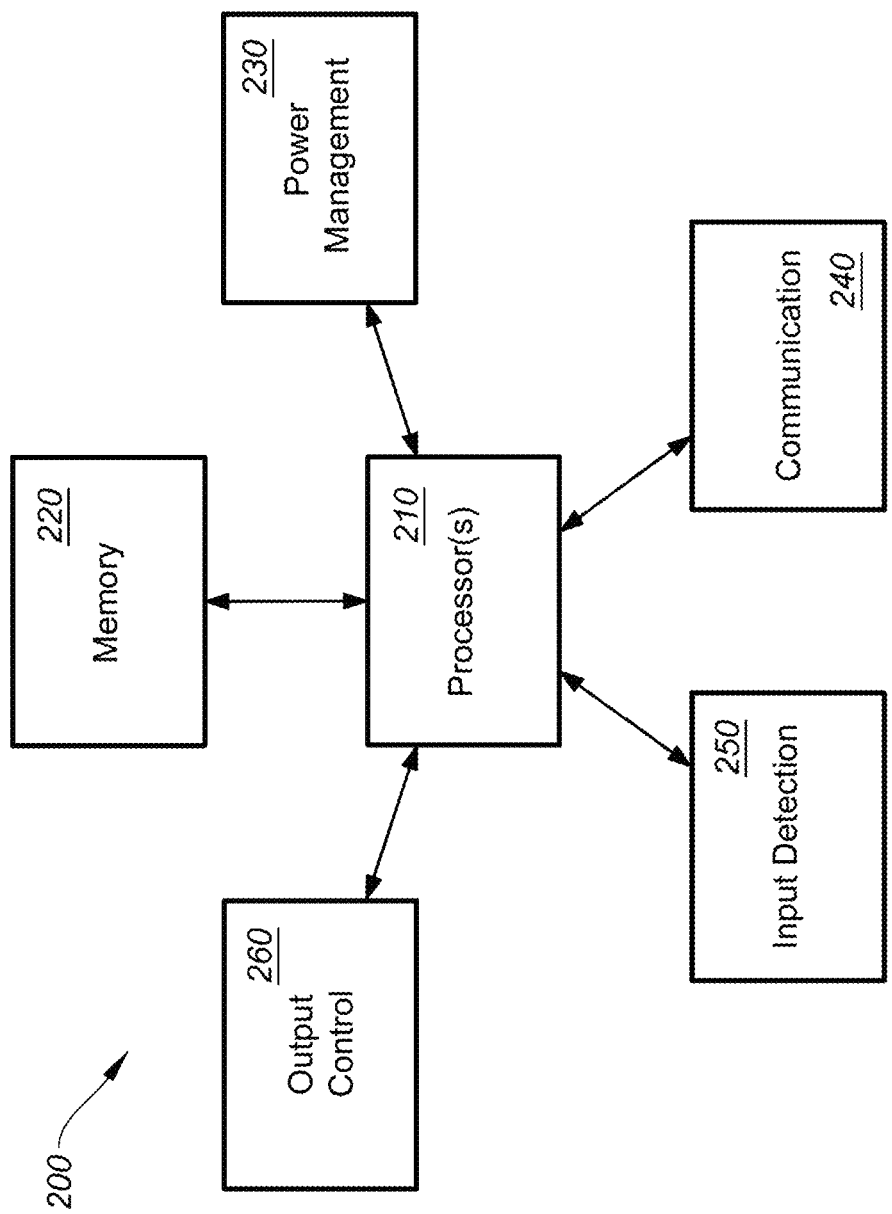
FIG. 2 shows a system for operating a computer peripheral device, according to certain embodiments.

FIG. 2 shows a system 200 for operating a computer peripheral device (e.g., computer mouse 130, keyboard 140, etc.), according to certain embodiments. System 200 may be configured to operate any of the computer peripheral devices shown or not shown herein but within the wide purview of the present disclosure. System 200 may include processor(s) 210, memory 220, a power management system 230, a communication module 240, an input detection module 250, and an output control module 260. Each of the system blocks 220-260 can be in electronic communication with processor(s) 210 (e.g., via a bus system). System 200 may include additional functional blocks that are not shown or discussed to prevent obfuscation of the novel features described herein. System blocks 220-260 may be implemented as separate blocks, or alternatively, more than one system block may be implemented in a single block. In the context described herein, system 200 can be incorporated into any computer peripheral devices (e.g., input devices) described or mentioned herein, as would be appreciated by one of ordinary skill in the art with the benefit of this disclosure.

In certain embodiments, processor(s) 210 may include one or more microprocessors and can be configured to control the operation of system 200. Alternatively or additionally, processor(s) 210 may include one or more microcontrollers (MCUs), digital signal processors (DSPs), or the like, with supporting hardware and/or firmware (e.g., memory, programmable I/Os, etc.), and/or software, as would be appreciated by one of ordinary skill in the art. Processor(s) 210 can control some or all aspects of the operation of computer mouse 130 (e.g., system blocks 220-260). Alternatively or additionally, some of system blocks 220-260 may include additional dedicated processor(s), which may work in conjunction with processor(s) 210. For instance, MCUs, µCs, DSPs, and the like, may be configured in other system blocks of system 200. Communications block 240 may include a local processor, for instance, to control aspects of communication with host computer 110 (e.g., via Bluetooth, Bluetooth LE, RF, IR, hardwire, ZigBee, Z-Wave, Logitech Unifying, or other communication protocol). Processor(s) 210 may be local to the computer peripheral device (e.g., contained therein), may be external to the computer peripheral device (e.g., off-board processing, such as by a corresponding host computing device), or a combination thereof. Processor(s) 210 may perform any of the various functions and methods described and/or covered by this disclosure in conjunction with any other system blocks in system 200. In some implementations, processor 302 of FIG. 3 may work in conjunction with processor 210 to perform some or all of the various methods described throughout this disclosure. In some embodiments, multiple processors may increase performance characteristics in system 200 (e.g., speed and bandwidth), however multiple processors are not required, nor necessarily germane to the novelty of the embodiments described herein. One of ordinary skill in the art would understand the many variations, modifications, and alternative embodiments that are possible.

Memory block ("memory") 220 can store one or more software programs to be executed by one or more processors (e.g., processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read-only memory (ROM), data stored in a smart key cap (e.g., RFID tags), as further described below, and/or applications stored in media storage that can be read into memory for execution by processing devices (e.g., processor(s) 210). Software can be implemented as a single program or a collection of separate programs and can be stored in non-volatile storage and copied in whole or in-part to volatile working memory during program execution. In some embodiments, memory 220 may store data corresponding to inputs on the computer peripheral device, such as a detected movement of the computer peripheral device, a sensor (e.g., optical sensor, accelerometer, etc.), activation of one or more input elements (e.g., key structures, buttons, sliders, touch-sensitive regions, etc.), or the like. Stored data may be aggregated and sent via reports to a host computing device.

In certain embodiments, memory 220 can store the various data described throughout this disclosure. Memory 220 can be referred to as a storage system or storage subsystem and can store one or more software programs to be executed by processors (e.g., in processor(s) 210). It should be understood that "software" can refer to sequences of instructions that, when executed by processing unit(s) (e.g., processors, processing devices, etc.), cause system 200 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations as described herein.

Power management system 230 can be configured to manage power distribution, recharging, power efficiency, and the like. In some embodiments, power management system 230 can include a battery (not shown), a Universal Serial Bus (USB)-based recharging system for the battery (not shown), and power management devices (e.g., voltage regulators—not shown), and a power grid within system 200 to provide power to each subsystem (e.g., communications block 240, etc.). In certain embodiments, the functions provided by power management system 230 may be incorporated into processor(s) 210. Alternatively, some embodiments may not include a dedicated power management block. For example, functional aspects of power management block 240 may be subsumed by another block (e.g., processor(s) 210) or in combination therewith. The power source can be a replaceable battery, a rechargeable energy storage device (e.g., super capacitor, Lithium Polymer Battery, NiMH, NiCd), or a corded power supply. The recharging system can be an additional cable (specific for the recharging purpose), or it can use a USB connection to recharge the battery.

Communication system 240 can be configured to enable wireless communication with a corresponding host computing device (e.g., 110), or other devices and/or computer peripherals, according to certain embodiments. Communication system 240 can be configured to provide radiofrequency (RF), Near-Field Communication (NFC), Bluetooth®, Logitech proprietary communication protocol (e.g., Unifying, Gaming Lightspeed, or others), infra-red (IR), ZigBee®, Z-Wave, or other suitable communication technology to communicate with other computing devices and/or peripheral devices. System 200 may optionally comprise a hardwired connection to the corresponding host computing device. For example, computer peripheral device 140 can be configured to receive a USB, FireWire®, Thunderbolt®, or other universal-type cable to enable bi-directional electronic communication with the corresponding host computing device or other external devices. Some embodiments may utilize different types of cables or connection protocol standards to establish hardwired communication with other entities. In some aspects, communication ports (e.g., USB), power ports, etc., may be considered as part of other blocks described herein (e.g., input detection module 250, output control module 260, etc.). In some aspects, communication system 240 can send reports generated by the processor(s) 210 (e.g., HID data, streaming or aggregated data, etc.) to a host computing device. In some cases, the reports can be generated by the processor(s) only, in conjunction with the processor(s), or other entity in system 200. Communication system 240 may incorporate one or more antennas, oscillators, etc., and may operate at any suitable frequency band (e.g., 2.4 GHz), etc. One of ordinary skill in the art with the benefit of this disclosure would appreciate the many modifications, variations, and alternative embodiments thereof.

Input detection module 250 can control the detection of a user-interaction with input elements on an input device. For instance, input detection module 250 can detect user inputs from motion sensors, keys (e.g., smart key structures, conventional keys), or buttons (e.g., depressible elements), roller wheels, scroll wheels, track balls, touch pads (e.g., one and/or two-dimensional touch sensitive touch pads), click wheels, dials, keypads, microphones, GUIs, touch-sensitive GUIs, proximity sensors (e.g., IR, thermal, Hall effect, inductive sensing, etc.), an image sensor based detection such as gesture detection (e.g., via webcam), audio based detection such as voice input (e.g., via microphone), or the like, as would be appreciated by one of ordinary skill in the art with the benefit of this disclosure. Alternatively, the functions of input detection module 250 or subset thereof can be subsumed by processor 210, or in combination therewith.

In some embodiments, input detection module 250 can detect a touch or touch gesture on one or more touch sensitive surfaces on computer mouse 130. Input detection block 250 can include one or more touch sensitive surfaces or touch sensors. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Certain embodiments of computer peripheral device 140 may or may not utilize touch detection or touch sensing capabilities.

Input detection block 250 can include touch and/or proximity sensing capabilities. Some examples of the types of touch/proximity sensors may include, but are not limited to, resistive sensors (e.g., air-gap 4-wire based, based on carbon loaded plastics which have different electrical characteristics depending on the pressure (FSR), interpolated FSR, strain gages, etc.), capacitive sensors (e.g., surface capacitance, self-capacitance, mutual capacitance, etc.), optical sensors (e.g., light barrier type (default open or closed), infrared light barriers matrix, laser based diode coupled with photodetectors that could measure the time of flight of the light path, etc.), acoustic sensors (e.g., piezo-buzzer coupled with microphones to detect the modification of a wave propagation pattern related to touch points, etc.), inductive sensors, magnetic sensors (e.g., Hall Effect, etc.), or the like.

Input detection module 250 may include a movement tracking sub-block that can be configured to detect a relative displacement (movement tracking) of a computer peripheral device. For example, input detection module 250 optical sensor(s) such as IR LEDs and an imaging array of photodiodes to detect a movement of a computer peripheral device relative to an underlying surface. A computer peripheral device may optionally include movement tracking hardware that utilizes coherent (laser) light. Moving tracking can provide positional data (e.g., delta X and delta Y data from last sampling) or lift detection data. For example, an optical sensor can detect when a user lifts the computer peripheral device (e.g., computer mouse 130) off of an underlying surface (also referred to as a "work surface") and can send that data to processor 210 for further processing. In some embodiments, processor 210, the movement tracking block (which may include an additional dedicated processor), or a combination thereof, as would be appreciated by one of ordinary skill in the art with the benefit of this disclosure.

In certain embodiments, accelerometers can be used for movement detection. Accelerometers can be electromechanical devices (e.g., micro-electromechanical systems (MEMS) devices) configured to measure acceleration forces (e.g., static and dynamic forces). One or more accelerometers can be used to detect three-dimensional (3D) positioning. For example, 3D tracking can utilize a three-axis accelerometer or two two-axis accelerometers (e.g., in a "3D air mouse," HMD, or another device). Accelerometers can further determine if the computer peripheral device has been lifted off of an underlying surface and can provide movement data that may include the velocity, physical orientation, and acceleration of a computer peripheral device. In some embodiments, gyroscope(s) can be used in lieu of or in conjunction with accelerometer(s) to determine movement or input device orientation.

In some embodiments, output control module 260 can control various outputs for a corresponding computer peripheral device. For instance, output control module 260 may control a number of visual output elements (e.g., LEDs, LCD or LED screens/keys), displays, audio outputs (e.g., speakers), haptic output systems, or the like. One of ordinary skill in the art with the benefit of this disclosure would appreciate the many modifications, variations, and alternative embodiments thereof.

Although certain systems may not be expressly discussed, they should be considered as part of system 200, as would be understood by one of ordinary skill in the art. For example, system 200 may include a bus system to transfer power and/or data to and from the different systems therein. It should be appreciated that system 200 is illustrative and that variations and modifications are possible. System 200 can have other capabilities not specifically described herein. Further, while system 200 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Embodiments of the present invention can be realized in a variety of apparatuses including electronic devices (e.g., computer peripheral devices) implemented using any combination of circuitry and software. Furthermore, aspects and/or portions of system 200 may be combined with or operated by other sub-systems as required by design. For example, input detection module 250 and/or memory 220 may operate within processor(s) 210 instead of functioning as separate entities. In addition, the inventive concepts described herein can also be applied to any electronic device. Further, system 200 can be applied to any of the computer peripheral devices described in the embodiments herein, whether explicitly, referentially, or tacitly described (e.g., would have been known to be applicable to a particular computer peripheral device by one of ordinary skill in the art). The foregoing embodiments are not intended to be limiting and those of ordinary skill in the art with the benefit of this disclosure would appreciate the myriad applications and possibilities.

Figure 3:
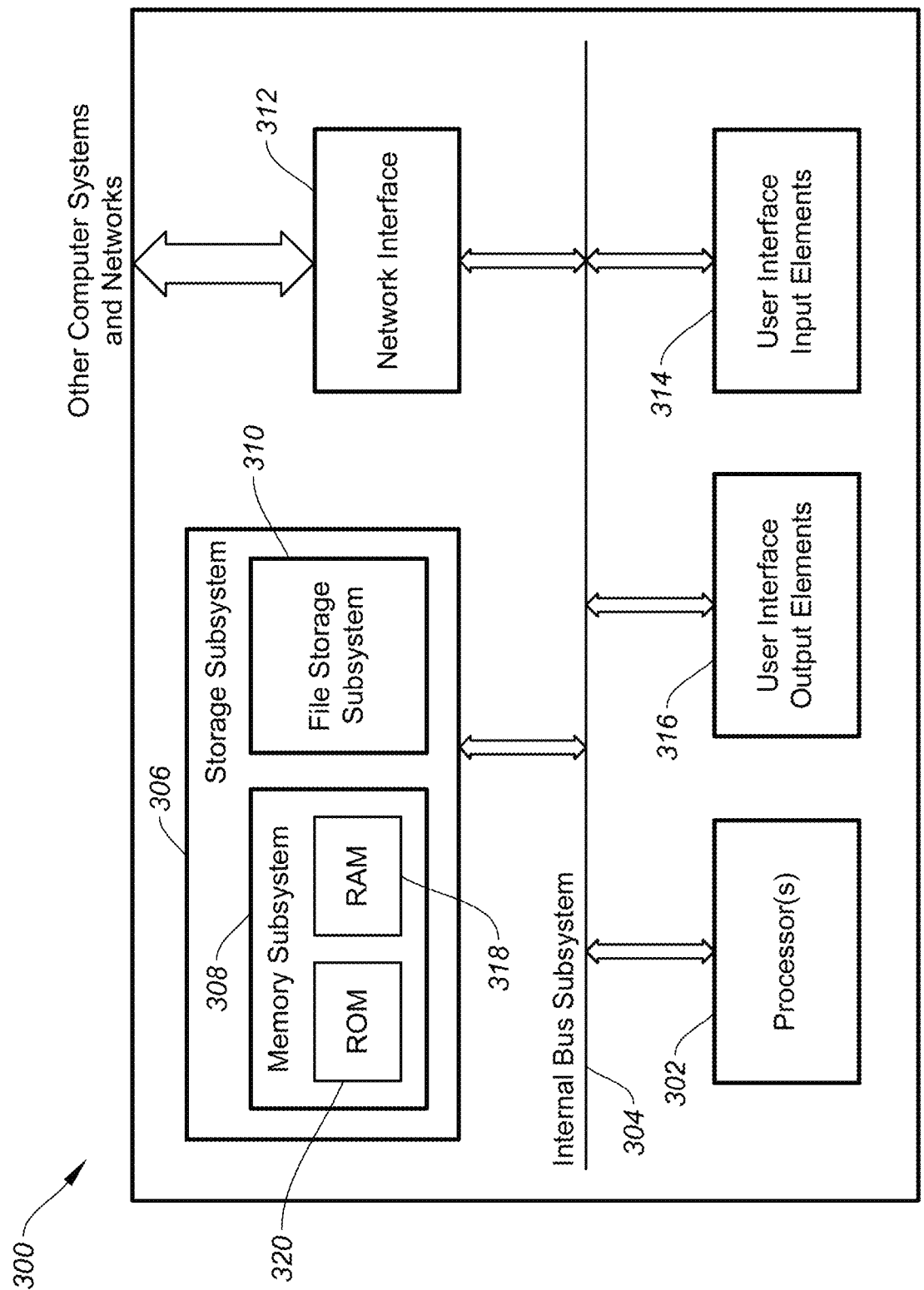
FIG. 3 is a simplified block diagram of a host computing device, according to certain embodiments.

FIG. 3 is a simplified block diagram of a host computing device 300, according to certain embodiments. Host computing device 300 can implement some or all functions, behaviors, and/or capabilities described herein that would use electronic storage or processing, as well as other functions, behaviors, or capabilities not expressly described. Host computing device 300 can include a processing subsystem (processor(s)) 302, a storage subsystem 306, user interfaces 314, 316, and a communication interface 312. Computing device 300 can also include other components (not explicitly shown) such as a battery, power controllers, and other components operable to provide various enhanced capabilities. In various embodiments, host computing device 300 can be implemented in any suitable computing device, such as a desktop or laptop computer (e.g., desktop 110), mobile device (e.g., tablet computer, smart phone, mobile phone), wearable device, media device, or the like, or in peripheral devices (e.g., keyboards, etc.) in certain implementations.

Processor(s) 302 can include MCU(s), micro-processors, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function, portions of functions, or a combination of methods, functions, etc., described throughout this disclosure.

Storage subsystem 306 can be implemented using a local storage and/or removable storage medium, e.g., using disk, flash memory (e.g., secure digital card, universal serial bus flash drive), or any other non-transitory storage medium, or a combination of media, and can include volatile and/or non-volatile storage media. Local storage can include a memory subsystem 308 including random access memory (RAM) 318 such as dynamic RAM (DRAM), static RAM (SRAM), synchronous dynamic RAM (e.g., DDR), or battery backed up RAM or read-only memory (ROM) 320, or a file storage subsystem 310 that may include one or more code modules. In some embodiments, storage subsystem 306 can store one or more applications and/or operating system programs to be executed by processing subsystem 302, including programs to implement some or all operations described above that would be performed using a computer. For example, storage subsystem 306 can store one or more code modules for implementing one or more method steps described herein.

A firmware and/or software implementation may be implemented with modules (e.g., procedures, functions, and so on). A machine-readable medium tangibly embodying instructions may be used in implementing methodologies described herein. Code modules (e.g., instructions stored in memory) may be implemented within a processor or external to the processor. As used herein, the term "memory" refers to a type of long term, short term, volatile, nonvolatile, or other storage medium and is not to be limited to any particular type of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine-readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or any combination thereof. When implemented in software, firmware, middleware, scripting language, and/or microcode, program code or code segments to perform tasks may be stored in a machine-readable medium such as a storage medium. A code segment (e.g., code module) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc. These descriptions of software, firmware, storage mediums, etc., apply to systems 200 and 300, as well as any other implementations within the wide purview of the present disclosure. In some embodiments, aspects of the invention (e.g., surface classification) may be performed by software stored in storage subsystem 306, stored in memory 220 of a computer peripheral device, or both. One of ordinary skill in the art with the benefit of this disclosure would appreciate the many modifications, variations, and alternative embodiments thereof.

Implementation of the techniques, blocks, steps and means described throughout the present disclosure may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module may comprise sets of instructions (codes) embodied on a computer-readable medium that directs a processor of a host computing device 110 to perform corresponding actions. The instructions may be configured to run in sequential order, in parallel (such as under different processing threads), or in a combination thereof. After loading a code module on a general-purpose computer system, the general-purpose computer is transformed into a special purpose computer system.

Computer programs incorporating various features described herein (e.g., in one or more code modules) may be encoded and stored on various computer readable storage media. Computer readable media encoded with the program code may be packaged with a compatible electronic device, or the program code may be provided separately from electronic devices (e.g., via Internet download or as a separately packaged computer readable storage medium). Storage subsystem 306 can also store information useful for establishing network connections using the communication interface 312.

Computer system 300 may include user interface input devices 314 elements (e.g., touch pad, touch screen, scroll wheel, click wheel, dial, button, switch, keypad, microphone, etc.), as well as user interface output devices 316 (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 314 to invoke the functionality of computing device 300 and can view and/or hear output from computing device 300 via output devices of user interface 316.

Processing subsystem 302 can be implemented as one or more processors (e.g., integrated circuits, one or more single core or multi core microprocessors, microcontrollers, central processing unit, graphics processing unit, etc.). In operation, processing subsystem 302 can control the operation of computing device 300. In some embodiments, processing subsystem 302 can execute a variety of programs in response to program code and can maintain multiple concurrently executing programs or processes. At a given time, some or all of a program code to be executed can reside in processing subsystem 302 and/or in storage media, such as storage subsystem 304. Through programming, processing subsystem 302 can provide various functionality for computing device 300. Processing subsystem 302 can also execute other programs to control other functions of computing device 300, including programs that may be stored in storage subsystem 304.

Communication interface (also referred to as network interface) 312 can provide voice and/or data communication capability for computing device 300. In some embodiments, communication interface 312 can include radio frequency (RF) transceiver components for accessing wireless data networks (e.g., Wi-Fi network; 3G, 4G/LTE, 5G; etc.), mobile communication technologies, components for short range wireless communication (e.g., using Bluetooth communication standards, NFC, etc.), other components, or combinations of technologies. In some embodiments, communication interface 312 can provide wired connectivity (e.g., universal serial bus (USB), Ethernet, universal asynchronous receiver/transmitter, etc.) in addition to, or in lieu of, a wireless interface. Communication interface 312 can be implemented using a combination of hardware (e.g., driver circuits, antennas, modulators/demodulators, encoders/decoders, and other analog and/or digital signal processing circuits) and software components. In some embodiments, communication interface 312 can support multiple communication channels concurrently.

User interface input devices 314 may include any suitable computer peripheral device (e.g., computer mouse, keyboard, gaming controller, remote control, stylus device, etc.), as would be appreciated by one of ordinary skill in the art with the benefit of this disclosure. User interface output devices 316 can include display devices (e.g., a monitor, television, projection device, etc.), audio devices (e.g., speakers, microphones), haptic devices, etc. Note that user interface input and output devices are shown to be a part of system 300 as an integrated system. In some cases, such as in laptop computers, this may be the case as keyboards and input elements as well as a display and output elements are integrated on the same host computing device. In some cases, the input and output devices may be separate from system 300, as shown in FIG. 1. One of ordinary skill in the art with the benefit of this disclosure would appreciate the many modifications, variations, and alternative embodiments thereof.

It will be appreciated that computing device 300 is illustrative and that variations and modifications are possible. A host computing device can have various functionality not specifically described (e.g., voice communication via cellular telephone networks) and can include components appropriate to such functionality. While the computing device 300 is described with reference to particular blocks, it is to be understood that these blocks are defined for convenience of description and are not intended to imply a particular physical arrangement of component parts. For example, processing subsystem 302, storage subsystem 306, user interfaces 314, 316, and communications interface 312 can be in one device or distributed among multiple devices. Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Host computing devices or even peripheral devices described herein can be implemented using system 300.

Designs that Accommodate Users with Physical Limitations or Disabilities

Aspects of the novel concepts described herein include a computer peripheral device that can be interfaced and articulated with a high degree of accuracy and efficiency by any user, including those that may have physical limitations that may make operating conventional mice difficult or impractical due to their small input elements (e.g., scroll wheel, side buttons, etc.) that require a high level of articulation to manipulate. Conventional input devices that are designed accommodate users with physical limitations tend to either separate input elements over multiple devices or make very large input devices designed with the assumption that large features make the physical manipulation of those elements easier. However, said users often do not prefer having multiple devices placed around a workstation when they can have an integrated unit, despite the challenges it may present. Further, larger features (e.g., large trackball and large supporting bezel) may make accessing one input element (e.g., trackball) easier for physically limited users, it can make accessing other input elements on the same device more challenging. Moreover, those devices are often optimized for a particular orientation. Some users may need to configure their hand adjacent to the input device to use their inoperable digits or a portion of their hand as an anchor or brace, as shown for example in FIGS. 5A-8D, and then access the various input elements of the input device using their palm, working digits, other portions of their hand, or the like. Thus, there is a tradeoff of precision versus fatigue. Large devices can sometimes provide a higher level of precision for users with a lower level of dexterity (for ergonomically designed devices), but they often also require a larger amplitude of movement, which introduces more fatigue. The size of various embodiments described herein provide a good balance for the tradeoff between precision and fatigue, and further provide ergonomic enhancements that accommodate user with limited mobility, dexterity, and control, as will be further described in the details that follow.

There are many variations of how an impaired user may anchor their hand, which can make conventional designs ineffective for many different users. For instance, input devices that are separated over multiple individual units can exacerbate the challenge of using impaired hands over multiple individual devices. Despite the possible ease of interfacing with separated input elements over multiple devices, manipulating one's hands to move efficiently between the multiple elements can be challenging, impractical, inefficient, and in some cases impossible in a productivity setting. Large devices with large input elements and bezels can make accessing input elements at different angles from an anchored hand position adjacent to the device challenging or impossible because the large housing/bezel may obstruct or completely block access to the user's hand. Despite the conventional wisdom on input devices that can accommodate physically impaired users, aspects of the invention are directed to smaller input devices with adequately large input elements configured in easily accessible locations (e.g., not blocked by a large bezel) that make access possible from any angle, even when bracing one's hand on a worksurface, and the features are positioned relative to one another with enough distance to prevent inadvertent activation of a second or third input element (e.g., scroll bar, left/right buttons) while trying to access a first input element (e.g., trackball). Furthermore, the industrial design of the various embodiments described herein is sleek, ergonomic, and professional looking.

FIGS. 4A-4C show different views of a novel computer peripheral device 400, according to certain embodiments. Computer peripheral device 400 may be a computer mouse, however other embodiments may employ some or all of the novel concepts described herein for a different form factor, such as a remote control, game controller, or any other suitable computer peripheral device.

Computer mouse 400 can include a housing 410, trackball 420, scroll bar 430, left mouse button 440, right mouse button 445, and securing mount 450, among other input/output elements (e.g., additional buttons, LEDs, touch sensitive touch pads, etc.) that may be included. Housing 410 (also referred to as a bezel) is shown as a triangular shape, which presents several advantages over conventional shapes (e.g., square). For example, housing 410 can accommodate trackball 420 in a corner such that there is very little bezel surrounding trackball 420 relative to two sides of housing 410, making access to the trackball 420 easy from at least two sides of the computer mouse, particular when accessing from non-conventional locations and angles, or when the user's hand is anchored on the underlying worksurface adjacent to the computer mouse, as further shown in FIG. 5. In contrast, conventional designs often have square bezels, which obstructs similar access from every angle. Further, the triangular base provides a strong foundational support. Alternatively or additionally, a pill or "race track" shaped housing may be employed, as further described below with respect to FIGS. 8C-8D In some embodiments, trackball 420 is typically configured near a corner of the top side of housing 410 such that there is very little bezel between the trackball and the edge of housing 410, as shown in FIGS. 4A-4C. This may provide easy access to trackball 420 from any angle, as described above, and as shown and described below at least with respect to FIG. 5. The track ball is typically between 30-60 mm diameter inclusive, with exemplary embodiments being approximately 44 mm+/−5 mm.

In certain embodiments, scroll bar 430 is typically configured on the top side of the housing at a location between a center point of the top side of the housing and a first side of the three sides, the first side being opposite the first corner that trackball 420 is configured. Scroll bar 430 is typically oriented parallel to the first side, although some embodiments may employ other angles (e.g., perpendicular to the first side). The distance between the trackball 420 and scroll bar 430 is far enough so that a user can operate the scroll bar from any angle without inadvertently manipulating the trackball, but close enough so that transitions from the trackball to scroll bar and vice versa are easy. The width of scroll bar 420 is at least twice the diameter of scroll bar 420, and typically within +/−20% of the diameter of the trackball. In some aspects, the trackball to scroll bar distance can be 15-25 mm, the trackball to an edge of the housing can be 10-20 mm, the scroll bar to an edge of the housing can be 10-20 mm, a height of a top of the housing can be 25-35 mm, a distance from a center of a side to an opposite corner may be 90-120 mm, a width of the scroll bar can be 40-70 mm, and a diameter of scroll bar may be 10-20 mm. These ranges are for some exemplary embodiments, however dimensions outside of these ranges can be used, as would be appreciated by one of ordinary skill in the art with the benefit of this disclosure. The size, placement, and orientation of scroll bar 420 can accommodate a number of different users, and particularly those with physical limitations, as shown in FIG. 6 and further described below.

In further embodiments, computer mouse 400 may include one or more buttons including left button 440 and right button 445, which may be operable to generate control signals when pressed that correspond to left/right mouse clicks. Left and right buttons 440/445 can be configured on the top of housing 410 and may curve down to the sides of housing 410 at regions 442/447, respectively. Buttons 440/445 are uniquely configured to be depressible from the top of housing 410 and from the side of housing 410. This capability can accommodate a number of different users and computer mouse interaction methodologies, and particularly those with physical limitations. For instance, for users that brace their hand on the work surface adjacent to the computer mouse, it may be difficult to position their hand (e.g., palm) to articulate a button press on the top of computer mouse 400. Instead, a user can laterally push against the side of the buttons at locations 442/447 to articulate a button press, which may be substantially easier for some users.

In some embodiments, computer mouse 400 may include securing mount 450, which may be any suitable mechanism that slows computer mouse 400 to be firmly secured to an underlying worksurface to prevent movement. Computer mouse 400 shows a threaded screw hole, however other methods of fixation can be used. For example, adhesive strips, non-slip silicon feet, a free-standing silicon pad, suction cups, or other suitable methods of fixation can be applied, as would be appreciated by one of ordinary skill in the art with the benefit of this disclosure.

In some exemplary embodiments, a computer mouse includes a housing having a top side and a bottom side, one or more processors disposed in the housing, a trackball configured on the top side of the housing and controlled by the one or more processors, and a scroll bar disposed in the top side of the housing and controlled by the one or more processors. The width of the scroll bar is typically at least twice a diameter of the scroll bar, and the bottom side of the housing can be configured to be placed on a surface while the computer mouse is being operated. In some embodiments, the housing may have a triangular shape defined by three corners and three sides, each of the three sides coupled to a corresponding two of the three corners, and a center of the trackball is configured on the top side of the housing at a location between a center point of the top side of the housing and a first corner of the three corners. In some cases, the scroll bar is configured on the top side of the housing at a location between the center point of the top side of the housing and a first side of the three sides, the first side being opposite the first corner of the three corners. The scroll bar may be oriented parallel to the first corner. The diameter of the trackball may be between 30-60 mm inclusive. The computer mouse may further include a first button (e.g., left click button) configured on the top side of the housing and a second button (e.g., right click button) configured on the top side of the housing, where the first button and second button are controlled by the one or more processors and form at least a portion of the top side of the housing. In some aspects, the first button curves from the top side of the housing to a first side of the housing and is operable to be activated by a downward pressing force imparted on the top side of the housing and on a lateral pressing force imparted on the first side of the housing. Similarly, the second button can curve from the top side of the housing to a second side of the housing and is operable to be activated by a downward pressing force imparted on the top side of the housing and on a lateral pressing force imparted on the second side of the housing. The bottom side of the housing may include a mounting fixture that is operable to secure the computer mouse to an underlying surface. The width of the scroll bar is at least twice the diameter of the scroll bar, and typically within +/−20% of the diameter of the trackball.

Figure 5A:
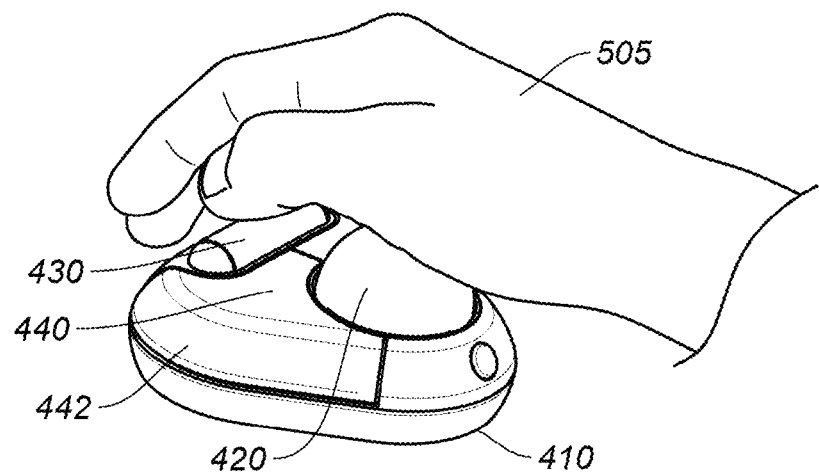
FIGS. 5A-5B show how a trackball can be accessed by users with physical limitations, according to certain embodiments.
Figure 5B:
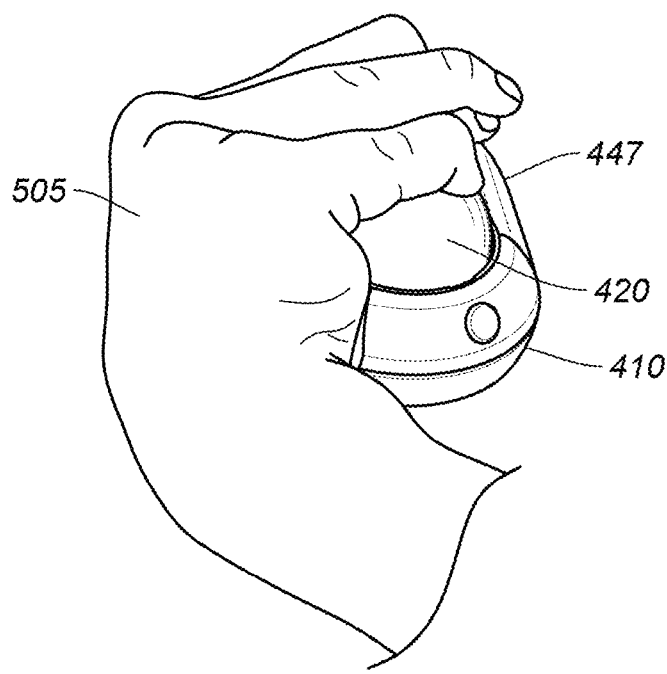

FIGS. 5A-5B show how a trackball can be accessed by users with physical limitations, according to certain embodiments. Specifically, user 505 manipulates the computer mouse in a non-conventional manner by bracing their hand on the worksurface adjacent to computer mouse 400. From this position, the user can manipulate one or more input elements, such as the trackball, from a preferred angle with minimal obstruction by the housing 410. Because the trackball 420 is relatively small (e.g., 44 mm) relative to conventional trackballs configured for limited mobility users (e.g., 100 mm), it may be substantially easier for user 505 to access the trackball with their palm, fingers, or other parts of their hand anchored to the worksurface because the overall height of the trackball is relatively low due to the small, low-profile housing as well as the placement of the trackball in one of the corners of the triangular housing, making it easily accessible from multiple angles to accommodate a wide variety of users, including those using unconventional methods of manipulating the computer mouse 400, as shown in FIGS. 5A-5B. It is notable that the input elements are still relatively large and easy to access and manipulate within the small housing, and far enough apart from one another so that users can access an input element (e.g., track ball) without inadvertently making movements on other input elements (e.g., scroll bar, buttons). In some embodiments, one or more input elements can be temporarily disabled while a user is manipulating the trackball or any combination of input elements, as would be appreciated by one of ordinary skill in the art with the benefit of this disclosure.

Figure 6A:
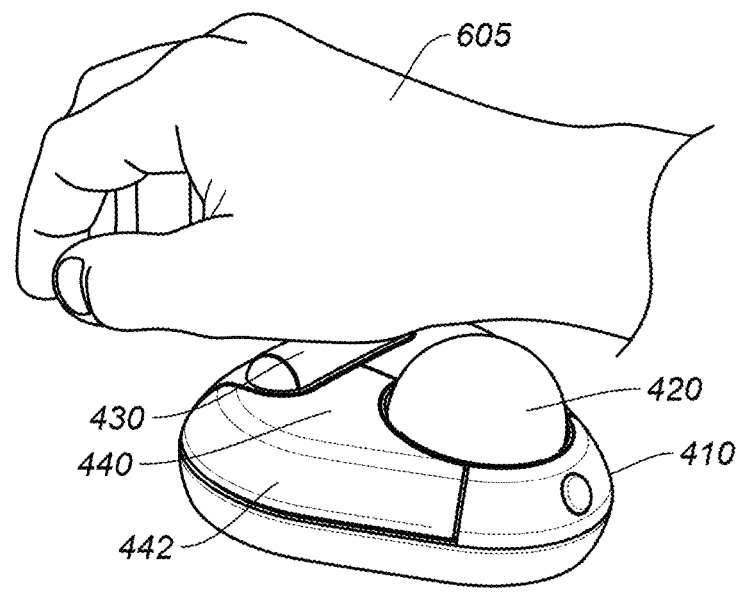
FIGS. 6A-6B show how a scroll bar can be accessed by users with physical limitations, according to certain embodiments.
Figure 6B:
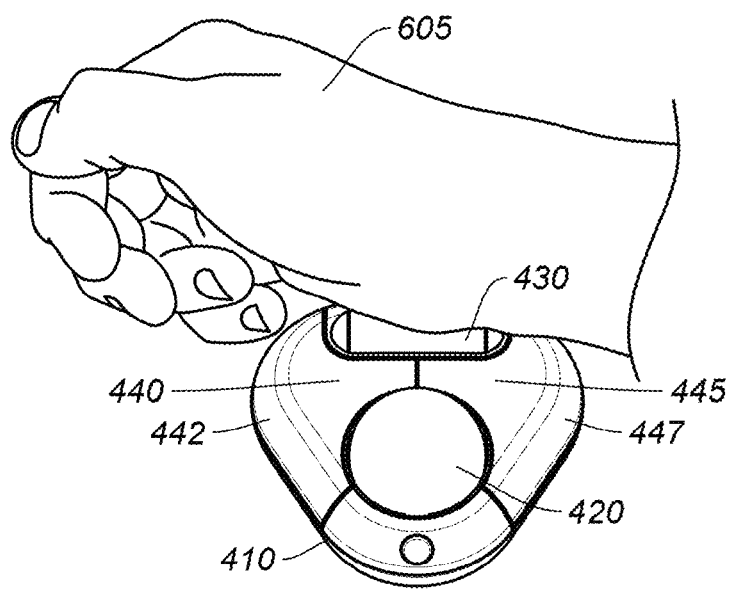

FIGS. 6A-6B show how a scroll bar can be accessed by users with physical limitations, according to certain embodiments. Specifically, user 605 manipulates the computer mouse in a non-conventional manner by bracing their hand on the worksurface adjacent to computer mouse 400. From this position, the user can manipulate one or more input elements, such as the scrollbar, from a preferred angle with minimal obstruction by the housing 410. It may be substantially easier for user 605 to access the trackball with their palm, fingers, or other parts of their hand anchored to the worksurface because scrollbar 430 is placed in an easily accessible location on the top of the small, low-profile housing, making it easily accessible from multiple angles to accommodate a wide variety of users, including those using unconventional methods of manipulating the computer mouse 400, as shown in FIGS. 6A-6B. As noted above, the input elements are relatively large and easy to access and manipulate within the small housing, and far enough apart from one another so that users can access an input element (e.g., scroll bar) without inadvertently making movements on other input elements (e.g., trackball, buttons). In some embodiments, one or more input elements can be temporarily disabled while a user is manipulating the scroll bar or any combination of input elements, as would be appreciated by one of ordinary skill in the art with the benefit of this disclosure.

A difference between a scroll bar and a scroll wheel is that a scroll bar should be at least twice the length of its diameter and, in some embodiments, is about the same width as the trackball (e.g., within 20%), making transitions between them easy, more accurate, and intuitive, without requiring substantially greater motor skills when manipulating either input element. Scroll wheels, on the other hand, typically have a narrower width than their diameter, and often less than ½ of the diameter. The scroll bar can be easily accessible and unobstructed from the back, sides, or from the top.

Figure 7A:
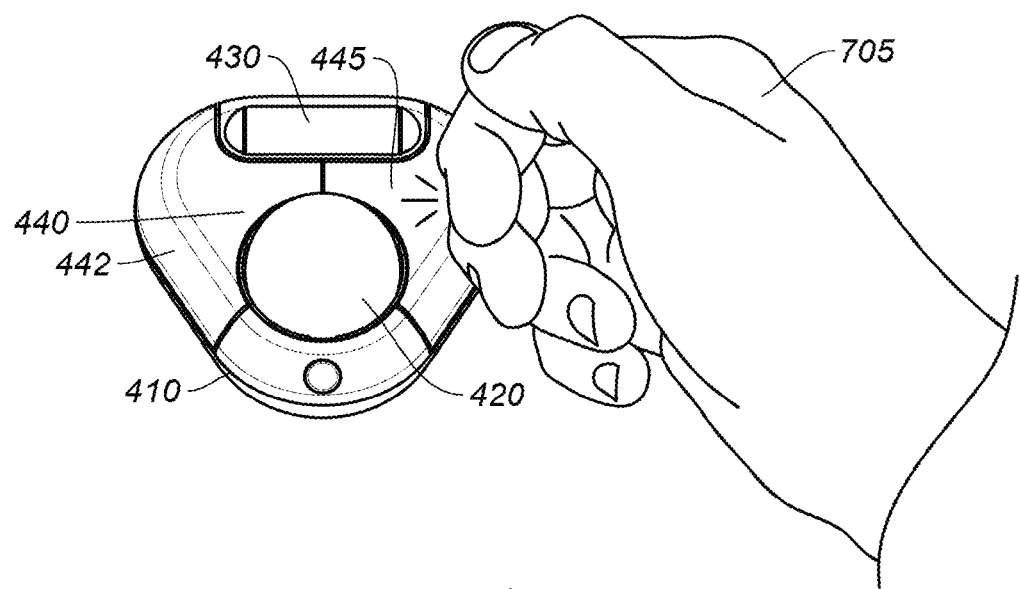
FIGS. 7A-7D show how input elements can be accessed from different angles by users with physical limitations, according to certain embodiments.
Figure 7B:
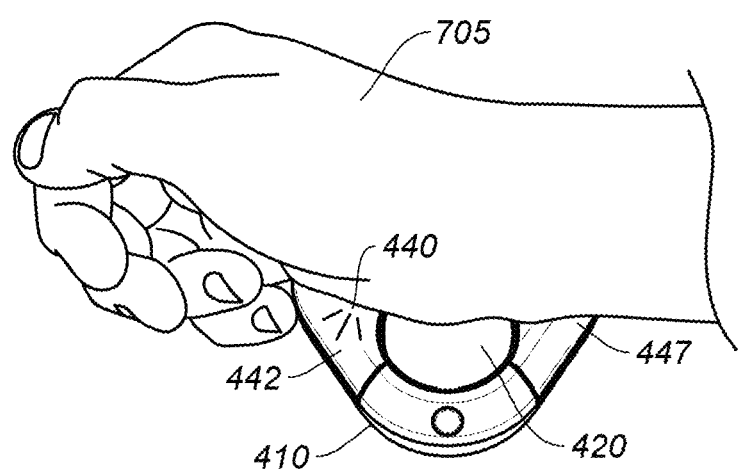
Figure 7C:
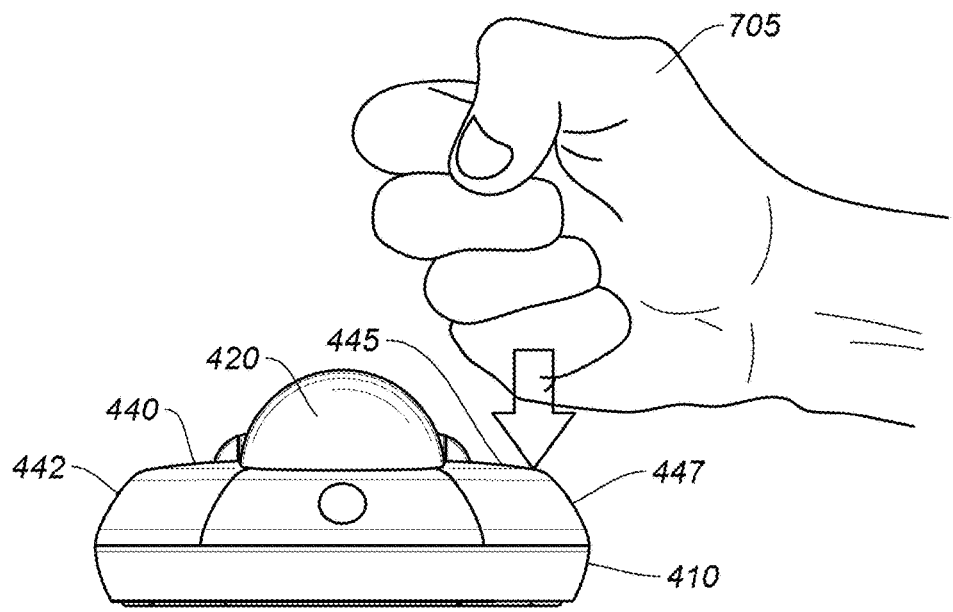
Figure 7D:
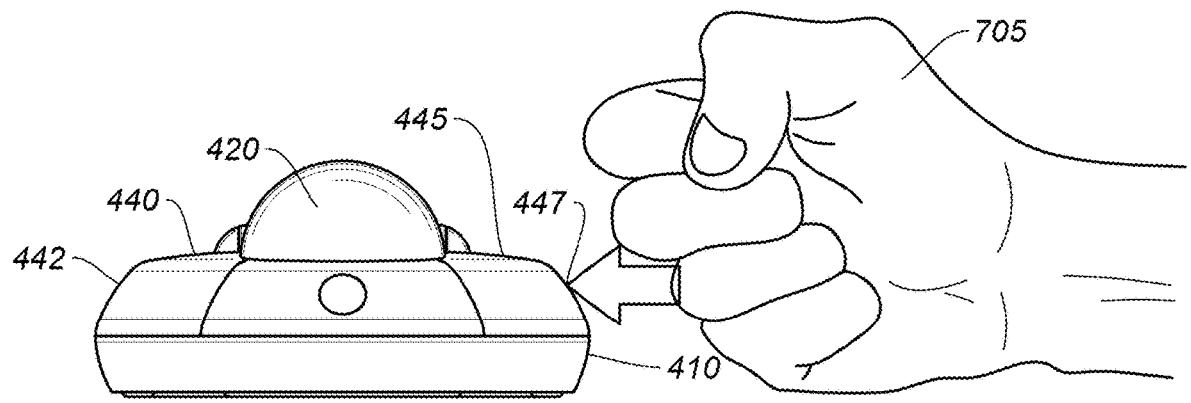

FIGS. 7A-7D show how input elements can be accessed from different angles by users with physical limitations, according to certain embodiments. As described above, computer mouse 400 may include one or more buttons including left button 440 and right button 445, which may be operable to generate control signals when pressed that correspond to left/right mouse clicks. Left and right buttons 440/445 can be configured on the top of housing 410 and may transition down to the sides of housing 410 at regions 442/447, respectively, via a curve, slant, hard edge, or other suitable transition. Buttons 440/445 are uniquely configured to be depressible from the top of housing 410 and from the side of housing 410. This capability can accommodate a number of different users and computer mouse interaction methodologies, and particularly those with physical limitations. For instance, for users that brace their hand on the work surface adjacent to the computer mouse, it may be difficult to position their hand (e.g., palm) to articulate a button press on the top of computer mouse 400. Instead, a user can laterally push against the side of the buttons at locations 442/447 to articulate a button press, which may be substantially easier for some users. FIGS. 7A-7D show just some of the many ways a user can articulate their hand to press the buttons 440/445 (among other input elements). For instance, FIG. 7A shows a user using a semi-closed hand to rest on the top of button 445. In another example, FIG. 7B shows a user using a portion of their palm (ulnar) to press a top of button 440. FIG. 7C shows a user using performing a downward press with their first on the top of button 440, according to certain embodiments. The design of computer mouse 400 provides clear landing surfaces with large contact areas, which can be helpful for users that do not or cannot use or articulate their fingers. FIG. 7D shows an example of a lateral press using a user's knuckle(s) or similar hand/finger feature. This can allow users who need to use a work surface as a support to slide along the work surface and contact button portion 442 from the side.

Figure 8A:
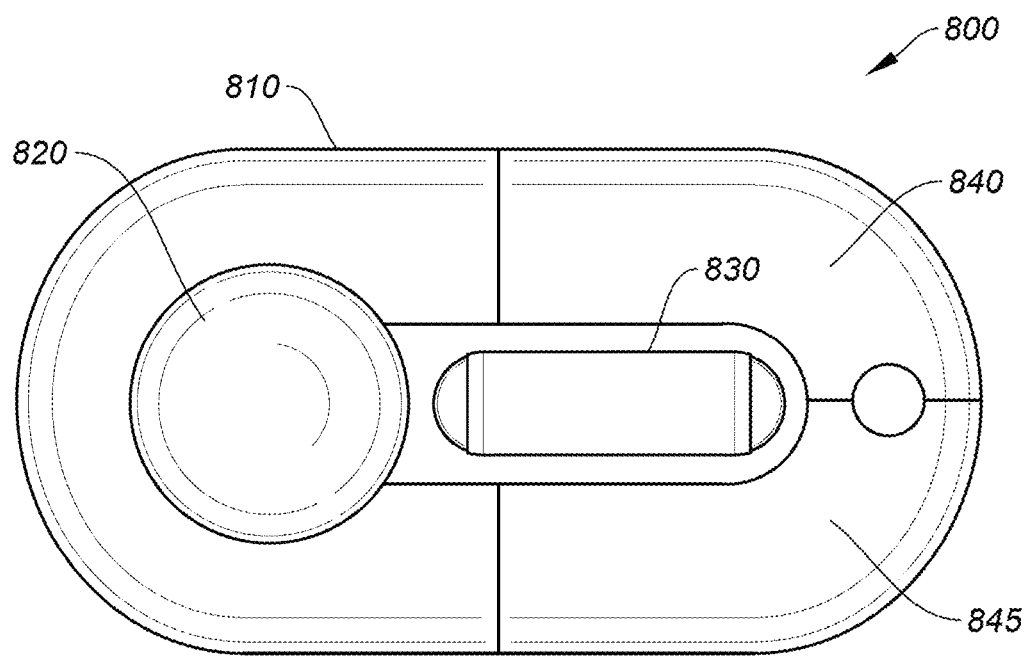
FIGS. 8A-8D show a number of different embodiments of a novel computer peripheral device, according to certain embodiments.
Figure 8B:
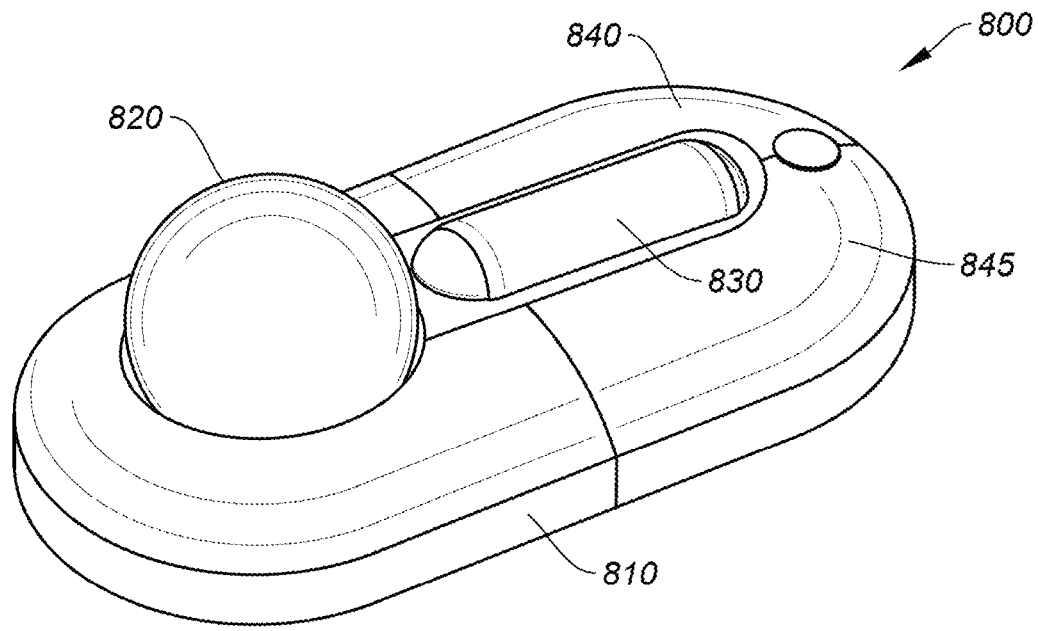
Figure 8C:
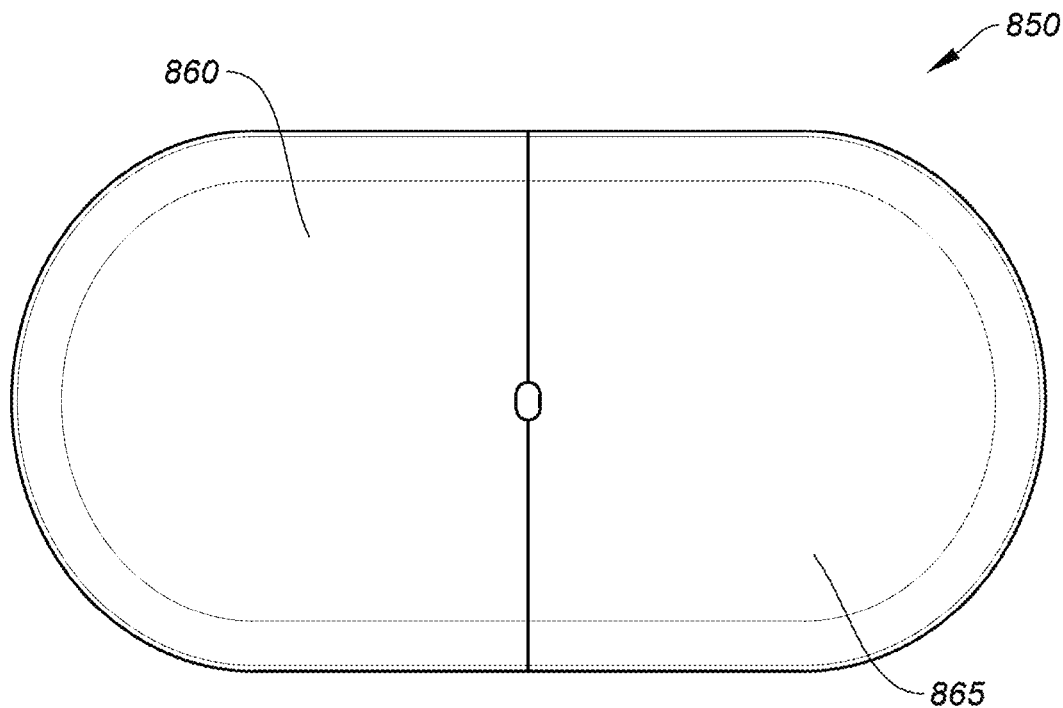
Figure 8D:
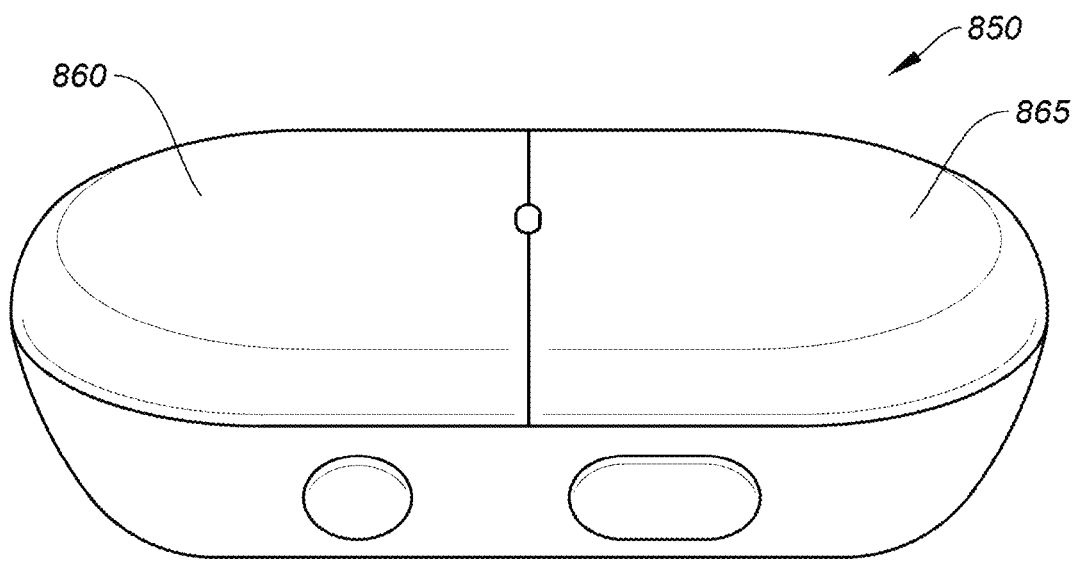

FIGS. 8A-8B show a number of different embodiments of a novel computer peripheral device, according to certain embodiments. FIG. 8A shows a computer mouse 800 configured in a pill or "race track" shape and includes a housing 810, trackball 820, a scroll bar 830, and buttons 840/845. The buttons may be configured to be accessible from the top and side of the housing 810, similar to the design of buttons 440/445 of FIGS. 4A-4C. Computer mouse 800 and the input elements thereon are configured to be easily accessible from any angle, the distance between them is wide enough to prevent accidental activation of other input elements, and at the same time are close enough to make transitioning between input elements easy and accurate.

FIG. 8C-8D show a standalone button module 850 including left and right buttons 860/865, respectively. The buttons 860/865 may work in conjunction with mouse 400 or independently thereof. For example, buttons 440 and 860 may both instantiate a left button press. Likewise, buttons 445 and 865 may both instantiate a right button press. Buttons 860/865 may be programmed to perform different functions than buttons 440/445, such as macros (e.g., copy/paste, last/next page, undo/redo, etc.). One of ordinary skill in the art with the benefit of this disclosure would appreciate the many modifications, variations, and alternative embodiments thereof.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local area network, a wide-area network, a virtual private network, the Internet, an intranet, an extranet, a public switched telephone network, an infrared network, a wireless network, and any combination thereof.

In embodiments utilizing a network server as the operation server or the security server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, including but not limited to JavaR, C, C# or C++, or any scripting language, such as Perl, Python or TCL, as well as combinations thereof. The server(s) may also include database servers, including without limitation those commercially available from Oracle®, Microsoft®, Sybase®, and IBM®.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connections to other computing devices such as network input/output devices may be employed.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions, and changes in the form of the methods and systems described herein may be made without departing from the spirit of the present disclosure. The accompanying claims and their equivalents are intended to cover such forms or modifications as would fall within the scope and spirit of the present disclosure.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, it should be understood that although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer mouse comprising:
a housing having:
   a top side; and
   a bottom side;
one or more processors disposed in the housing;
a trackball configured on the top side of the housing and controlled by the one or more processors; and
a scroll bar disposed in the top side of the housing and controlled by the one or more processors,
wherein a width of the scroll bar is at least twice a diameter of the scroll bar,
wherein the bottom side of the housing is configured to be placed on a surface while the computer mouse is being operated,
wherein the housing has a triangular shape defined by three corners and three sides, each of the three sides coupled to a corresponding two of the three corners,
wherein a center of the trackball is configured on the top side of the housing at a location between a center point of the top side of the housing and a first corner of the three corners,
wherein the scroll bar is configured on the top side of the housing at a location between the center point of the top side of the housing and a first side of the three sides, the first side being opposite the first corner of the three corners,
wherein a distance between the trackball and the scroll bar is 15-25 mm, and
wherein a distance between the trackball and one of the three sides is 10-20 mm.

2. The computer mouse of claim 1 wherein the scroll bar is oriented parallel to the first side.

3. The computer mouse of claim 1 wherein a diameter of the trackball is between 30-60 mm inclusive.

4. The computer mouse of claim 1 further comprising:
a first button configured on the top side of the housing; and
a second button configured on the top side of the housing,
wherein the first button and second button are controlled by the one or more processors, and
wherein the first button and second button form at least a portion of the top side of the housing.

5. The computer mouse of claim 4 wherein the first button curves from the top side of the housing to a first side of the housing,
wherein the first button is operable to be activated by a downward pressing force imparted on the top side of the housing and on a lateral pressing force imparted on the first side of the housing,
wherein the second button curves from the top side of the housing to a second side of the housing, and
wherein the second button is operable to be activated by a downward pressing force imparted on the top side of the housing and on a lateral pressing force imparted on the second side of the housing.

6. The computer mouse of claim 1 wherein the bottom side of the housing includes a mounting fixture that is operable to secure the computer mouse to an underlying surface.

7. The computer mouse of claim 1 wherein the width of the scroll bar is within +/−20% of the diameter of the trackball.

8. A computer mouse comprising:
a housing having:
   a top side; and
   a bottom side;
one or more processors disposed in the housing;
a trackball configured on the top side of the housing and controlled by the one or more processors; and
a scroll bar disposed in the top side of the housing and controlled by the one or more processors,
wherein the housing has a triangular shape defined by three corners and three sides, each of the three sides coupled to a corresponding two of the three corners,
wherein a distance between the trackball and the scroll bar is 15-25 mm,
wherein a distance between the trackball and one of the three sides is 10-20 mm,
wherein a distance between the scroll bar and one of the three sides is 10-20 mm, and
wherein the scroll bar has a width of 40-70 mm.

9. A computer mouse comprising:
a housing having:
   a top side; and
   a bottom side;
a trackball configured on the top side of the housing; and
a scroll bar disposed in the top side of the housing,
wherein a width of the scroll bar is at least twice a diameter of the scroll bar,
wherein the housing has a triangular shape defined by three corners and three sides, each of the three sides coupled to a corresponding two of the three corners,
wherein a distance between the trackball and the scroll bar is 15-25 mm,
wherein a distance between the trackball and one of the three sides is 10-20 mm,
wherein a distance between the scroll bar and one of the three sides is 10-20 mm, and
wherein a width of the scroll bar is within +/−20% of the diameter of the trackball.

* * * * *